United States Patent [19]
Lundgren

[11] Patent Number: 5,988,471
[45] Date of Patent: Nov. 23, 1999

[54] DEVICE IN LOAD CARRIERS

[75] Inventor: Anders Lundgren, Grimsås, Sweden

[73] Assignee: Industri, AB Thule, Hillerstorp, Sweden

[21] Appl. No.: 09/219,343

[22] Filed: Dec. 23, 1998

Related U.S. Application Data

[63] Continuation of application No. 08/737,399, Nov. 8, 1996, abandoned.

[30] Foreign Application Priority Data

May 25, 1994 [SE] Sweden .................................. 9401788

[51] Int. Cl.$^6$ ...................................................... B60R 9/00
[52] U.S. Cl. .......................... 224/329; 224/309; 224/310; 224/321; 224/322; 224/323; 224/327; 224/328; 224/331
[58] Field of Search ..................................... 224/309, 310, 224/321, 322, 323, 327, 328, 329, 331

[56] References Cited

FOREIGN PATENT DOCUMENTS

| 2413852 | 7/1979 | France . |
| 3405357 | 4/1991 | Germany . |
| 2221664 | 2/1990 | United Kingdom . |
| 9400315 | 1/1994 | WIPO . |

Primary Examiner—David J. Walczak
Assistant Examiner—Timothy L. Maust
Attorney, Agent, or Firm—Rouston, Rayzor, Vickery, Novak & Druce, L.L.P.

[57] ABSTRACT

A device for laterally translating the force vector between a load carrier foot and the upper surface of a vehicle roof according to the slope of the contour of the vehicle roof at the location of the foot upon the vehicle roof. The device includes a load carrier foot for attachment of a load carrier to the vehicle roof and the load carrier foot has a first foot support portion and a second foot support portion. A foot plate for engaging the upper surface of the vehicle roof is provided that is pivotally attached to the load carrier foot and has a first foot plate support portion adjacent the first foot support portion to form an inner support pair and a second foot plate support portion adjacent the second foot support portion to form an outer support pair. The foot plate is rotatable about its pivotal attachment to the load carrier foot between a first position wherein the force vector between the load carrier foot and the upper surface of the vehicle roof is directed through the inner support pair and a second position wherein the force vector between the load carrier foot and the upper surface of the vehicle roof is directed through the outer support pair. The foot plate is adapted to take the first position when placed adjacent vehicle roofs of steep contour and to take the second position when placed adjacent vehicle roofs of shallow contour.

2 Claims, 3 Drawing Sheets

DEVICE IN LOAD CARRIERS

RELATED PATENT APPLICATIONS

This is a continuation patent application of U.S. patent application Ser. No. 08/737,399 filed Nov. 8, 1996 entitled A DEVICE IN LOAD CARRIERS, now abandoned, said application, in its entirety is hereby expressly incorporated by reference into the present application.

DESCRIPTION

1. Technical Field

The present invention relates to a device in load carriers of the type which comprises a load carrier strut extending over the vehicle roof and having, at each end, a foot for securing and supporting the load carrier on the vehicle, the foot having a footplate which is pivotal about an axis longitudinal in relation to the vehicle, the footplate being intended for an abutment against the vehicle roof, and a clamping device for fixedly clamping the load carrier to the vehicle.

2. Background Art

Load carriers of the type mentioned by way of introduction are previously known in any number of variations. As a rule, the footplate is secured in the foot of the load carrier via a hinge or linkage arrangement in which the pivot axis of the linkage or hinge is substantially parallel with a horizontal axis in the longitudinal direction of the vehicle. Hereby, the foot of the load carrier and the footplate can be pre-set at an angle in relation to the slope of the vehicle roof at its edge region.

The above-outlined construction functions satisfactorily in many contexts, but cannot without substantial drawbacks be employed in such designs where the vehicle roof slopes very shallowly or not at all, in the region where the footplate provides its support. Because of the flatness of the vehicle roof in this region, the load carrying capacity of the roof is poor, and so there is an obvious risk that the footplate be urged so hard against the vehicle roof that it is deformed and suffers permanent damage. The problem becomes aggravated the further in from the vehicle roof edge that the footplate urges against the roof. In this type of vehicle roof, it is therefore desirable that the loading from the footplate on the vehicle roof act as close to the edge of the vehicle roof as possible where it still has a certain arching and thereby greater load carrying capacity. The problem can be described as the converse in such roof designs where the roof slopes steeply in the edge area inwards towards a region above the longitudinal center line of the vehicle. The object here is instead to provide a load carrying capacity as far in on the roof as possible, since the geometric clamping relationship of the load carrier foot will then be better. In return, a roof which slopes and is arched in this manner is considerably more rigid and is consequently better capable of withstanding the loadings involved.

Constructions are also previously known in the art in which attempts are made to obviate the above-outlined drawbacks by a pre-setting of the angle between the footplate and the load carrier foot with the aid of special adapters. Such a pre-setting implies either that the adapters must be modified to suit the vehicle and thus be sold as special accessories to each vehicle model, or that the adapters must be mounted in place in accurately and carefully indicated positions. Adapters of this type do not, therefore, constitute an attractive solution to this problem.

In view of the above described deficiencies associated with the use of known designs for devices in load carriers, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed load carrier supports and incorporates several additionally beneficial features.

The present invention has for its object to design a device intimated by way of introduction such that the drawbacks inherent in the prior art designs and constructions are obviated. In particular, the present invention has for its object to realize a device which permits a footplate to abut close to the edge region of a vehicle roof when the slope of the vehicle roof is very shallow, or when there is no slope at all in this region, while the load transferring portion of the footplate to the vehicle roof is displaced inwardly from the edge region of the vehicle roof when the roof slope is steeper. Thus, the present invention has for its object to design a device disclosed by way of introduction such that the loading on the footplate is rolled-over onto the vehicle roof from the edge region of the roof in an inward direction towards the center of the vehicle accordingly as the roof slope increases. Furthermore, the present invention also has for its object to realize a device which is simple and economical to manufacture and which is extremely reliable in operation.

The objects forming the basis of the present invention will be attained if the device intimated by way of introduction is characterized in that the footplate and the foot have two support surfaces which are pairwise moveable into load-transferring cooperation with one another, that the pairs of support surfaces are located in spaced apart relationship from one another in the lateral direction of the vehicle and thereby form an outer pair most proximal the edge of the vehicle roof and an inner pair at greater spaced apart relationship, and that the position for cooperation is movable between the pairs by a mutual rotation of the footplate and the foot about the axis of rotation which is longitudinal in relation to the vehicle.

As a result of this design and construction, the load-transferring cooperation between the foot and the footplate will lie at that portion of the footplate located most proximal the vehicle roof when the slope of the vehicle roof is shallow, while the load-transferring cooperation between the foot and the footplate will be moved in closer to the longitudinal center line of the vehicle when the roof slope increases.

The beneficial effects described above apply generally to the exemplary devices and mechanisms disclosed herein of the support device for load carriers. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

Figure 1:
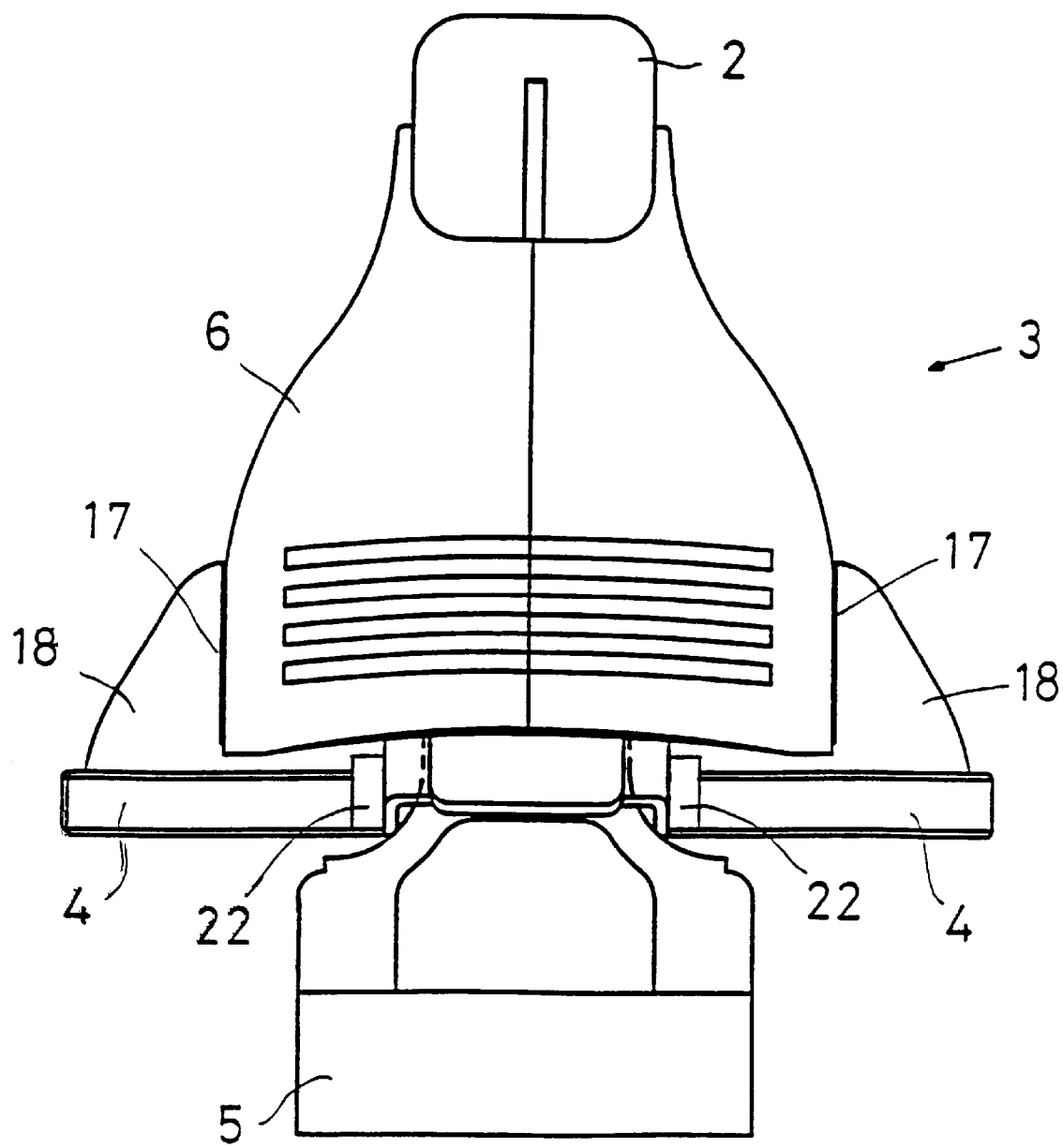
FIG. 1 is a vertical side elevation of a load carrier foot seen in the longitudinal direction of a load carrier strut in a direction in towards the center of the vehicle.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis, for the claims and as a representative basis for teaching one skilled in the art to variously employ the present invention.

With reference to the figures, a load carrier strut 1 extends transversely over a vehicle roof and has an end piece 2. The strut 1 is secured in a foot 3 which serves for anchoring and supporting the load carrier on a vehicle roof. At its lower end region, the foot 3 has a footplate 4 which is intended to rest on the vehicle roof and transfer to the roof the loading on the load carrier. Furthermore, the foot 3 is provided with a clamping device 5 for fixedly clamping the load carrier on the vehicle roof by engaging with a region which is undercut as seen from above at the side edge of the vehicle roof or with an anchorage device placed at this point. Under the action of a clamping member (not shown on the figures) accommodated in the foot 3, the clamping device 5 is movable in an upward direction towards the footplate 4 but, at the same time, in a lateral direction inwards, towards the longitudinal center line of the vehicle in which FIG. 1 is away from the observer of the figures, and in FIGS. 2 and 3 is in a direction to the left.

Figure 2:
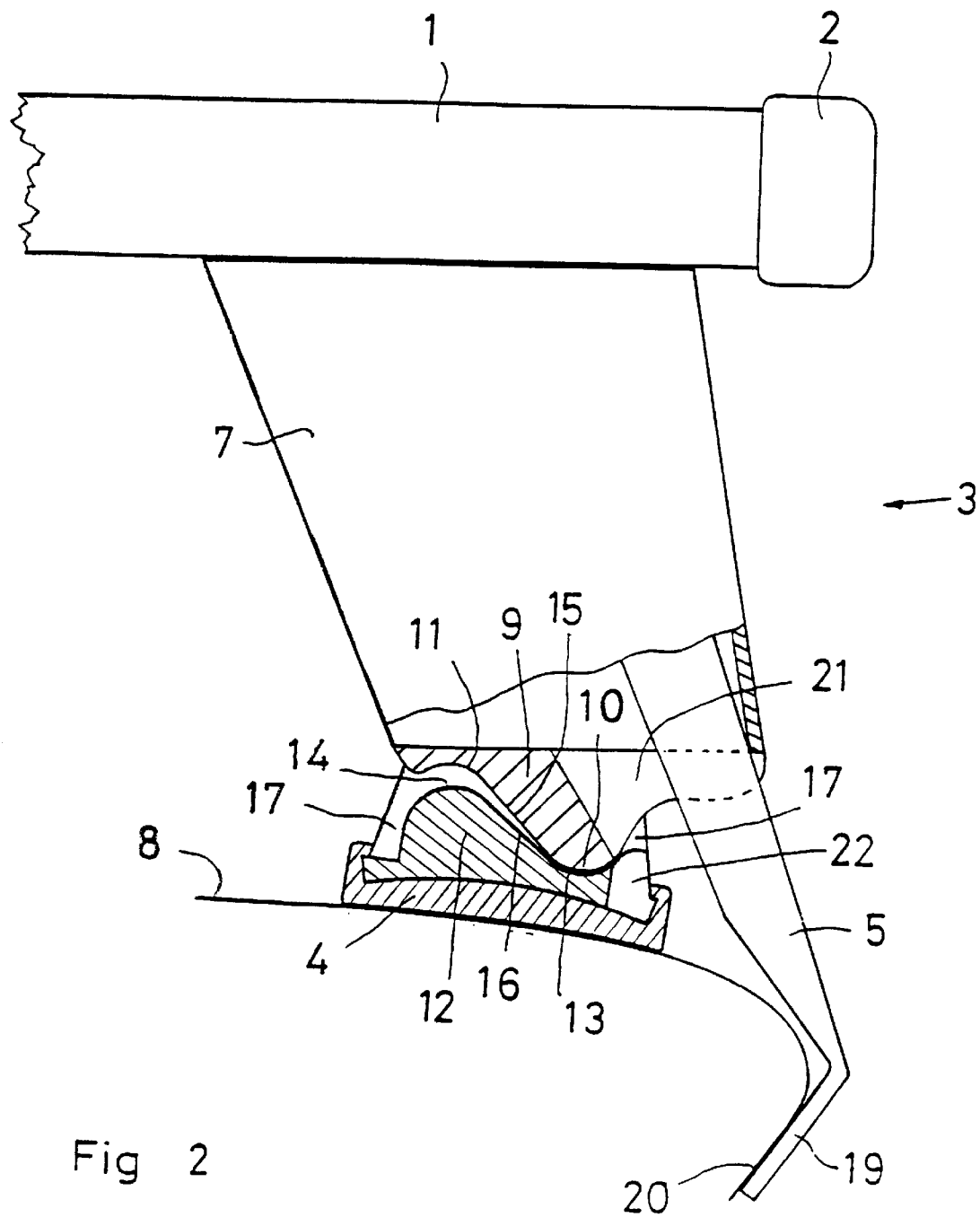
FIG. 2 is a section taken along the section marking A—A in FIG. 1 in a vehicle roof of shallow slope.

FIG. 2 shows a vertical partial section through the device according to the invention, taken approximately along the section marking A—A in FIG. 1. It should here be observed that the protective hood or cover 6 which surrounds the foot 3 proper in FIG. 1 has been removed so that only the body 7 of the foot 3 is shown. FIG. 2 further shows a situation in which a vehicle roof, whose contour line is shown by reference numeral 8, is of but a very shallow or flat slope in the lateral direction of the vehicle, in towards an area over the longitudinal center line of the vehicle roof. FIG. 3 shows the same view but in which the slope of the vehicle roof is considerably steeper than that depicted in FIG. 2.

Figure 3:
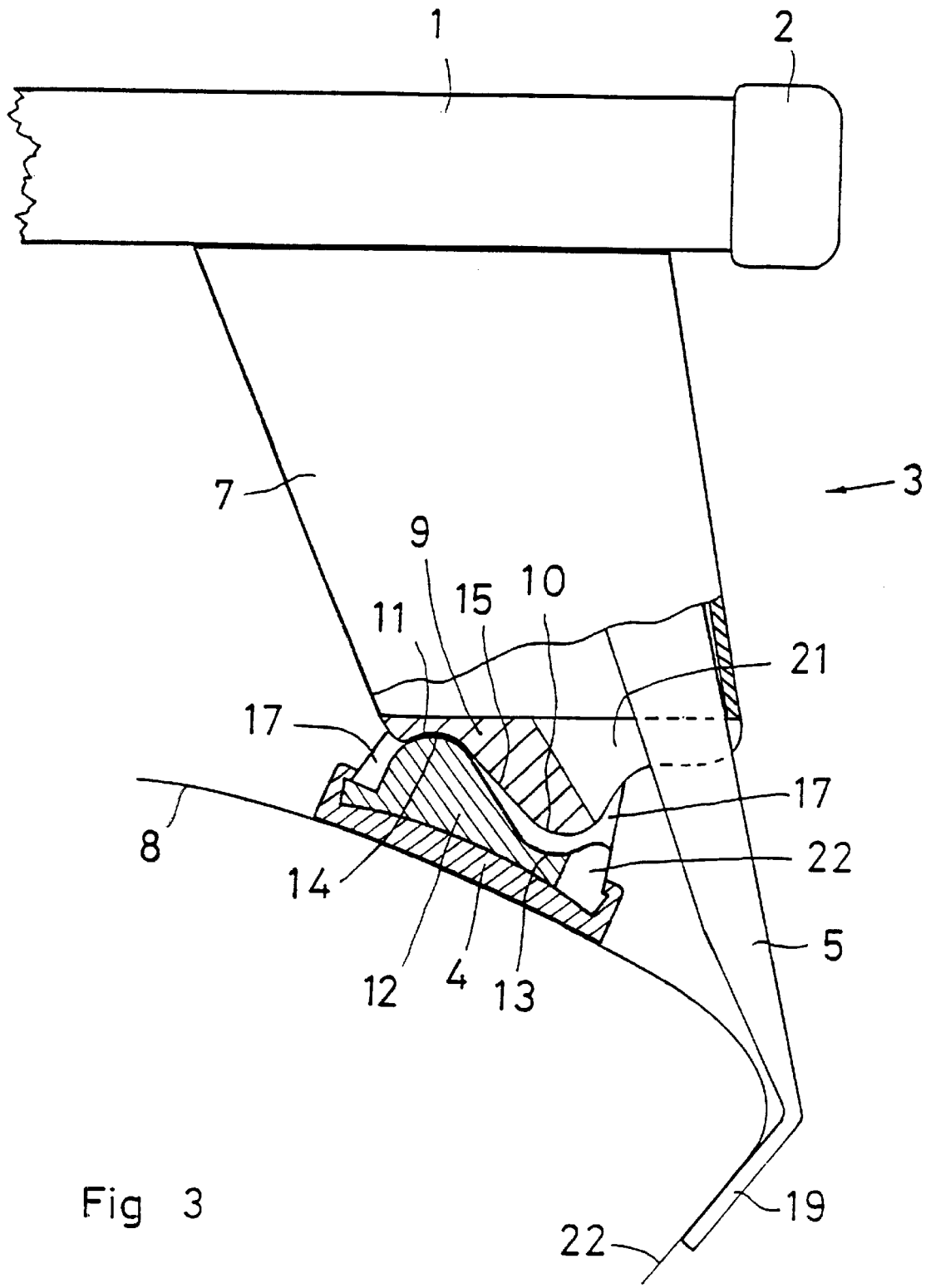
FIG. 3 is a corresponding section in a more steeply sloping vehicle roof.

It will further be apparent from FIGS. 2 and 3 that the body 7 of the foot 3 is provided, at its lower end, with a bottom portion 9 which has two support portions 10 and 11 extending in the longitudinal direction of the vehicle for cooperation with the footplate 4. Correspondingly, the footplate 4 has a body 12 produced of rigid material, this body having two support surfaces 13 and 14 which are longitudinal in relation to the vehicle and which are movable into load-transferring cooperation with the support surfaces 10 and 11, respectively, of the bottom portion 9. The support surfaces hereby form an outer pair 10 and 13, and an inner pair 11 and 14, in which "outer" relates to a position close to the edge of the vehicle roof, while "inner" relates to a position a slightly greater distance in towards the center of the vehicle from the edge of the roof. The pairs 10 and 13, and 11 and 14 are thereby disposed a distance from one another as seen in the lateral direction of the vehicle.

In the position illustrated in FIG. 2, the pair 10 and 13 of support surfaces cooperate with each other, the footplate 4 being relatively flat (horizontal direction) and abutting against the vehicle roof 8 close to its side edge area. Since the load-transferring cooperation takes place between the pair of support surfaces 10 and located most proximal the vehicle roof, the majority of the load carrier's loading against the vehicle roof will also impinge on the roof approximately in the area of the pair 10, 13 of support surfaces, i.e. relatively close to the edge of the vehicle roof.

In FIG. 2, the footplate 4 has been rotated or pivoted to an axis which is longitudinal in relation to the vehicle in a clockwise direction so that the slope of the footplate 4 will thereby be considerable towards an area above the vehicle roof at the central region of the roof. In this position, the support surfaces 11 and 14 cooperate with each other and, analogous with the foregoing description, it will be readily perceived that the loading from the load carrier will be substantially transferred to the vehicle roof 8 via the left part, i.e. inner portion of the footplate 4. The position of the load transfer to the vehicle roof will hereby be displaced inwards away from the edge region of the roof.

It will be apparent from the foregoing that the pairs of support surfaces are located in relation to one another such that, on cooperation between the outer pair 10 and 13, the underside of the footplate 4 can be approximately horizontal or be of insignificant slope up towards a region above the longitudinal center line of the vehicle roof, while, in cooperation between the inner pair 11 and 14, the angle of slope is considerably larger and may amount to close on 40° in relation to the horizontal.

In order to permit the above-described roll-over of load transfer in an inward direction towards the vehicle center when the slope of the footplate 4 increases, it is appropriate that the support surfaces within the pairs 10 and 11 and 13 and 14 be substantially complementary and preferably encompass parts of cylindrical surfaces where the longitudinal axis of the cylinder is substantially parallel with the longitudinal axis of the vehicle. Between the pairs of support surfaces, both the bottom plate and the body 12 have connecting surfaces 15 and 16, respectively, whereby the profiles of the bottom plate 9 and the body 12 will be approximately S-shaped in cross section. The positioning of the support surfaces 10 and 13 and 11 and 14, respectively, as well as the connecting surfaces 15 and 16, is such that engagement may take place simultaneously between all surfaces in an intermediate position of the slope of the footplate 4.

The above-mentioned cylindrical portions of the support surfaces 10 and 11 on the foot 3, or these support portions in their entirety, have center lines which are parallel with one another and which, in the vertical direction, are placed at approximately the same distance from the load carrier strut 1. On the other hand, on the footplate the distance for the center lines to the support surfaces 13 and 14 is located such that the space from the underside of the footplate to the center line of the outer support surface 13 is greater than the distance between the underside of the footplate 4 and the center line of the inner support surface 14.

In order to prevent displacement in the longitudinal direction of the vehicle between the foot 3 and the footplate 4, the footplate and the foot are provided with mutually engaging arrest surfaces, where the arrest surfaces 17 on the footplate 4 are transversely directed in relation to the longitudinal axis of the vehicle and thereby are also transversely directed or preferably at right angles to the center axes of the cylindrical portions of the support surfaces. The arrest surfaces 17 of the footplate 4 are disposed on projections 18 upwardly directed from the upper side of the footplate, the projections being placed, in the longitudinal direction of the vehicle, in front of and behind the foot 3 and abutting against the forward and rear defining surfaces of the foot. While not being apparent from the figures, it is the bottom plate 9 of the foot 3 that has its end surfaces (front and rear end surfaces in the longitudinal direction of the vehicle) designed as arrest surfaces in abutment against the arrest surfaces 17 of the footplate 4.

The clamping device 5 has, as is apparent from FIGS. 2 and 3, the form of a catch 19 which grasps beneath an undercut surface 22 in the edge region of the vehicle roof 8. Alternatively, the clamping device 5 may be designed for cooperation with specific anchorages placed in the region at the undercut surfaces 22. In order to permit the requisite movements of the clamping devices 5, the bottom plate 9 is provided with a recess 21 in its central region. Correspondingly, the footplate 4 has, in its central region, a recess 22 for the same purpose.

In order to prevent the footplate 4 from falling off when the load carrier is mounted in place, or when the load carrier is handled in the unmounted state, the arrest surfaces 17 of the footplate and the corresponding arrest surfaces of the foot 3 are ideally provided with means which retain the footplate on the foot 3 without in any way obstructing their mutual adjustments and settings.

A load carrier foot and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by letters patent is as follows:

1. A device for laterally translating the force vector between a load carrier foot and the upper surface of a vehicle roof according to the slope of the contour of the vehicle roof at the location of the foot upon the vehicle roof, said device comprising:

a load carrier foot for attachment of a load carrier to the vehicle roof, said load carrier foot having a first foot support portion and a second foot support portion;

a foot plate for engaging the upper surface of the vehicle roof, said foot plate being pivotally attached to said load carrier foot and having a first foot plate support portion adjacent said first foot support portion to form an inner support pair and a second foot plate support portion adjacent said second foot support portion to form an outer support pair; and said foot plate being rotatable about its pivotal attachment to said load carrier foot between a first position wherein the force vector between said load carrier foot and the upper surface of the vehicle roof is directed through said inner support pair and a second position wherein the force vector between said load carrier foot and the upper surface of the vehicle roof is directed through said outer support pair, said foot plate being adapted to take said first position when placed adjacent vehicle roofs of steep contour and to take said second position when placed adjacent vehicle roofs of shallow contour.

2. A support for a load carrier, said support comprising:

a foot for securing and supporting a load carrier on a vehicle, said foot having a foot plate that is pivotal about an axis longitudinal in relation to a carrying vehicle and adapted for abutment against a vehicle roof and a clamping device adapted to fixedly clamp said support to a vehicle roof;

said foot plate having a first plate support surface and a second plate support surface, said first and second plate support surfaces being arranged to selectively and matingly engage a first foot support surface and a second foot support surface, respectively, thereby forming a first pair of opposed support surfaces and a second pair of opposed support surfaces;

said first and second pair of opposed support surfaces being spaced apart, one from the other in a direction transverse to said pivot axis of said foot plate thereby establishing an outer and an inner pair of opposed support surfaces in relation to a carrying vehicle; and said first and second pair of opposed support surfaces being movable into different load-transferring cooperations with one another as a result of pivotal movement of said foot plate.

\* \* \* \* \*